June 20, 1967  S. AUSNIT  3,326,399
MAGNETIC PLASTIC FASTENER AND METHOD OF MAKING SAME
Filed March 10, 1965  3 Sheets-Sheet 1
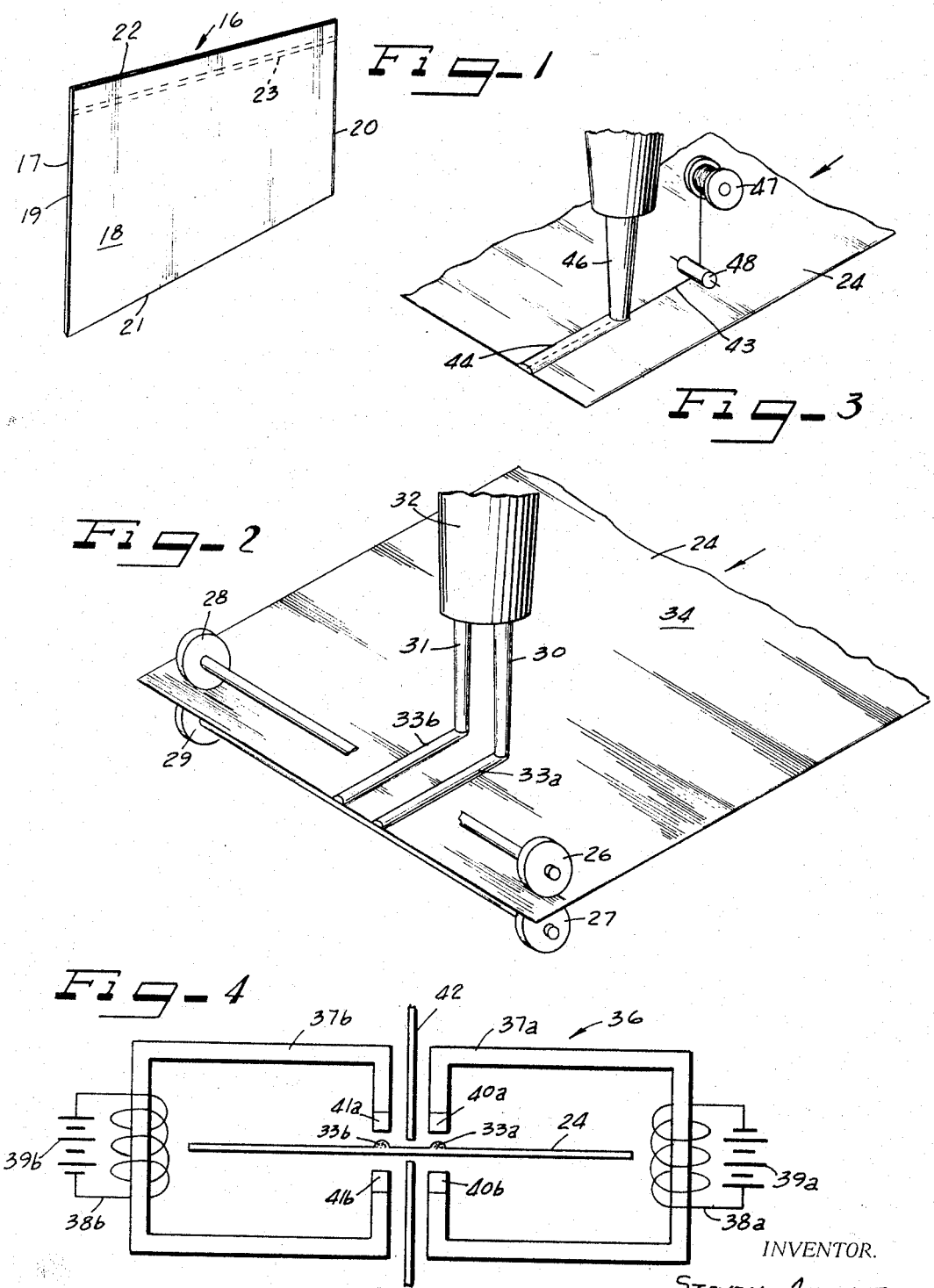
INVENTOR.
STEVEN AUSNIT
ATTORNEYS June 20, 1967 S. AUSNIT 3,326,399
MAGNETIC PLASTIC FASTENER AND METHOD OF MAKING SAME
Filed March 10, 1965 3 Sheets-Sheet 2
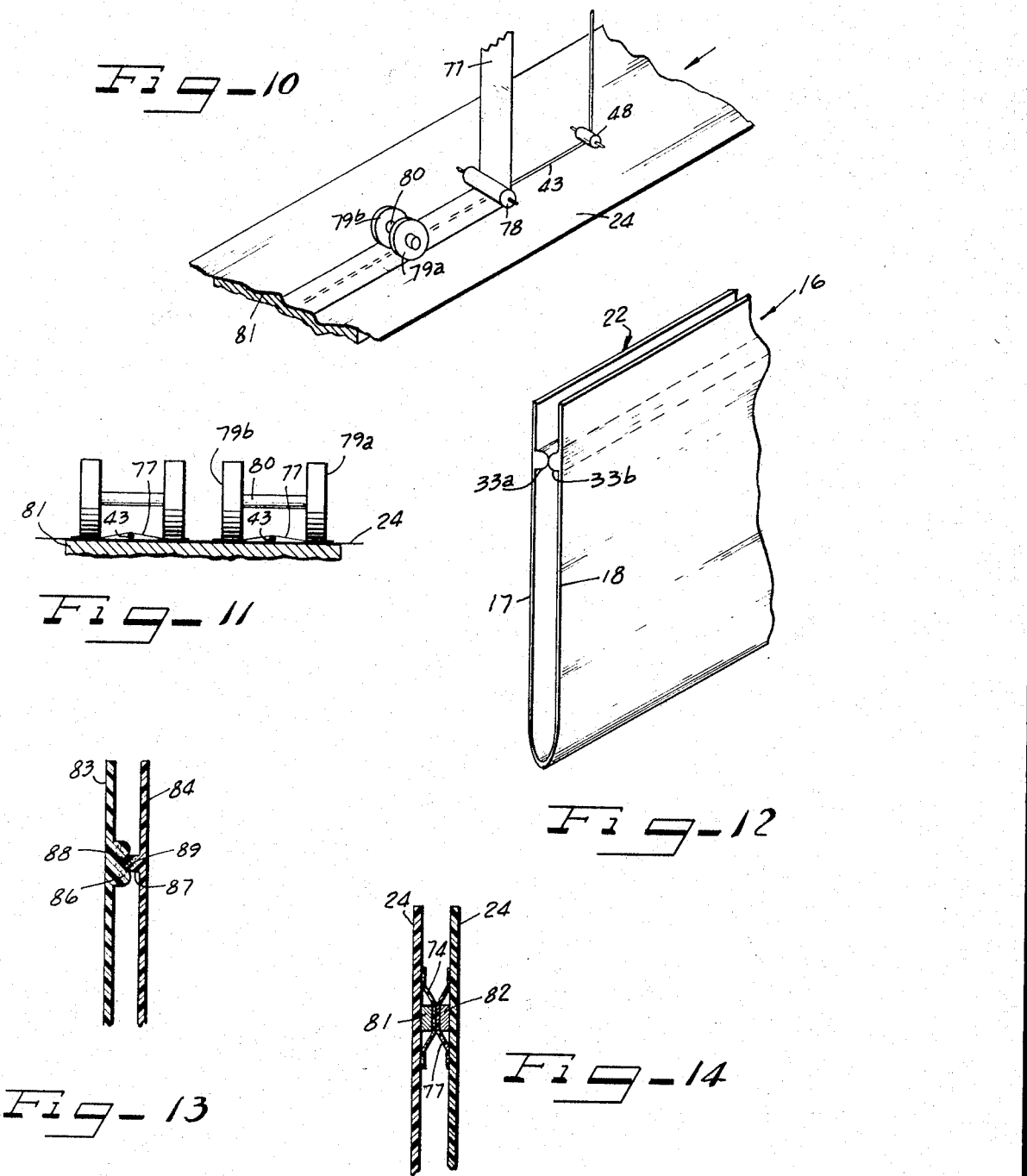
INVENTOR.
STEVEN AUSNIT
ATTORNEYS June 20, 1967 S. AUSNIT 3,326,399
MAGNETIC PLASTIC FASTENER AND METHOD OF MAKING SAME
Filed March 10, 1965 3 Sheets-Sheet 3

INVENTOR.
STEVEN AUSNIT
BY Hill, Sherman, Meroni, Gross & Simpson ATTORNEYS

United States Patent Office 3,326,399
Patented June 20, 1967

3,326,399
MAGNETIC PLASTIC FASTENER AND METHOD
OF MAKING SAME
Steven Ausnit, 124 E. 61st St.,
New York, N.Y. 10021
Filed Mar. 10, 1965, Ser. No. 438,510
5 Claims. (Cl. 215—3)

This invention relates generally to fasteners or closure devices and more particularly relates to a magnetic sliderless fastener and a method of making same wherein a pair of elongated thermoplastic sheets or strips are each provided with a magnetizable substance carried by or embedded within a thermoplastic material along the lengths of the strips whereby upon engagement of the magnetized portions of the strips a longitudinal closed magnetic circuit is formed to maintain the strips in closed or joined relation.

Sliderless fasteners or closures are in many instances more desirable than the "zipper" or other such devices since the mating members can be more quickly and easily joined together and separated and an air-tight seal can be provided.

The present invention contemplates a magnetic fastener useful in a variety of applications and which can be relatively inexpensively manufactured. One particularly useful application is made to containers such as pouches formed of thermoplastic material. In one form of the invention the magnetic fastener can be formed on a container made of extruded plastic at the time the container itself, or the plastic sheet or tube from which it is formed, is extruded. In other forms of the invention a thermoplastic bead containing magnetizable particles is extruded on the container after the tube from which the container is formed has been extruded.

The invention also contemplates the utilization of magnetizable wire as the magnetizable substance and includes a thermoplastic tape heat-sealed to a thermoplastic strip or to the walls of a plastic container in order to hold the wire on the thermoplastic strip or on the walls of the container.

It is, therefore, an object of the invention to provide a relatively inexpensively manufactured sliderless fastener or closure of the magnetic type.

Another object of the invention is to provide a method of making, in a simple and quick fashion, a sliderless fastener which incorporates magnetic means for holding the two sides of the fastener together.

Another object of the invention is to provide a method of extruding thermoplastic sheets with magnetic holding means formed thereon for use in making sliderless fasteners.

Yet another object of the invention is to provide a thermoplastic sheet with an integral bead of thermoplastic material formed thereon incorporating or having embedded therewithin a magnetizable substance for forming a magnetic sliderless fastener.

Still another object of the invention is to provide a magnetizable wire carried on a thermoplastic sheet by means of thermoplastic tape heat-sealed to the sheet, and a method of making same, whereby the sheet can be thereupon cut into sections and sliderless fasteners formed therefrom quickly and relatively inexpensively.

A further object of the invention is to provide a method and apparatus for forming pouches and the like containers whereby a tubular thermoplastic film is extruded with means formed thereon to provide a magnetic sliderless fastener, and thereafter merely slit and sealed at the ends to form the container.

Another object of the invention is to provide a method and apparatus for continuously extruding a thermoplastic bead on a running flat or tubular thermoplastic film incorporating therein or otherwise having bonded thereto a magnetizable substance or wire to provide an integral sliderless fastener of the magnetic type on the film.

Many other features, advantages and additional objects of the present invention reside in certain arrangements and combinations of parts which will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 1 is a perspective view of a container formed in accordance with the principles of the present invention and incorporating a sliderless fastener or closure of the magnetic type;

FIGURE 2 is a perspective view of one form of the invention whereby a bead of thermoplastic material having magnetizable particles therein is extruded directly onto a thermoplastic sheet;

FIGURE 3 is a perspective view of another form of the invention similar to that illustrated in FIGURE 2 but including provisions for laying out along the thermoplastic sheet a magnetizable wire ahead of the extruded bead to be covered by and bonded to the sheet by the bead;

FIGURE 4 is a schematic wiring diagram showing means for permanently magnetizing the magnetizable substance in a pair of beads formed on a thermoplastic sheet whereby the polarity of the two beads is reversed with respect to one another;

FIGURE 10 is a perspective view of another form of the invention whereby a thermoplastic tape is heat-sealed to a thermoplastic film by means of a roller to hold a length of magnetizable wire on the sheet;

FIGURE 11 is a front of the apparatus of FIGURE 10 but shows a pair of roller members instead of only one;

FIGURE 12 is an enlarged fragmentary perspective view of a pouch or container formed of extruded thermoplastic sheet material and constructed in accordance with the principles of the present invention;

Figures 5, 7:
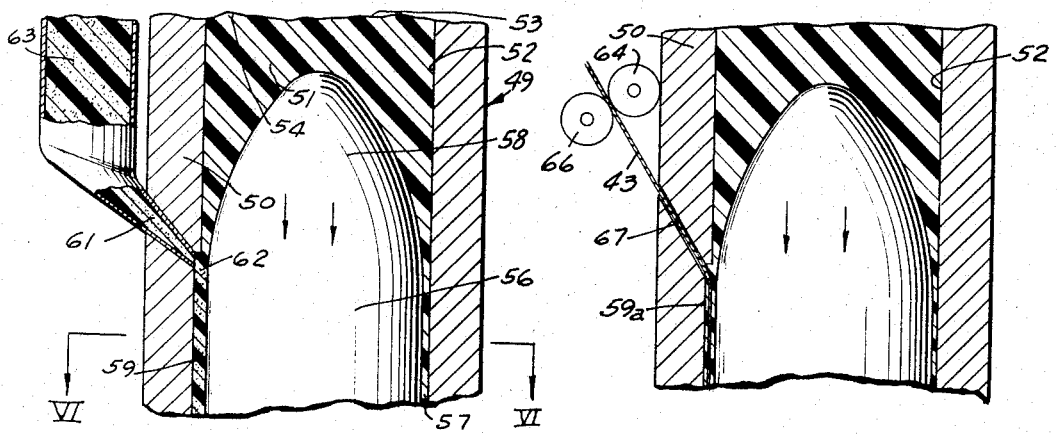
FIGURE 5 is a vertical cross-sectional view of an extrusion die constructed in accordance with the principles of the invention.
FIGURE 7 is a vertical cross-sectional view of another form of an extrusion die constructed in accordance with the invention.

FIGURE 13 is an enlarged fragmentary vertical sectional view of a top portion of a pouch similar to that illustrated in FIGURE 12 and showing a pair of beads having magnetizable particles therein formed on the opposite sides of the pouch to provide a magnetic sliderless fastener; and FIGURE 14 is similar to FIGURE 13 but shows the magnetic fastener formed of a pair of elongated wires or rods carried on the opposite sides of the pouch by means of thermoplastic tape heat-sealed to the sides of the pouch.

As shown in the drawings:

FIGURE 1 illustrates an exemplary article to which the principles of the present invention may be advantageously applied and which comprises a pouch-like container indicated generally at reference numeral 16 having a pair of opposite or confronting sides 17 and 18 joined together at ends 19 and 20 thereof.

Sides 17 and 18 are formed of thin, flexible sheet-form material which may constitute a single piece folded over at a bottom end 21 or which may be formed of two separate pieces suitably joined at the ends 17 and 18 and at the bottom 21. An open top end 22 is provided with a magnetic sliderless fastener or closure means 23 for selectively closing the top end 22 whereby the interior of the container is rendered substantially air-sealed.

The sides 17 and 18 of the container 16 may be constituted of a variety of fabrics or other materials having various degrees of strength, flexibility, etc. In addition the container may be formed of a single piece or sheet of thermoplastic material such as polyethylene and containers made of such material have met with a high degree of commercial success.

The closure or fastener means 23, which is effective in joining together the two sides 17 and 18 of the container along the upper margins thereof, is of the magnetic sliderless type and comprises a permanently magnetized substance carried on the facing walls of the container sides. The polarity of the magnetized substances on the two sides is reversed with respect to one another and alignable with one another across substantially the entire width of the container.

In order to close the container 16 it is merely necessary to urge the upper margins of sides 17 and 18 together whereupon the magnetic fastener 23 forms a longitudinal closed magnetic circuit to maintain the two sides in joined-together relation. The container can be opened by merely urging the top margins of the two sides apart, thus providing quick access into the container.

As the following description proceeds it will be appreciated that the principles of the invention find utility in a variety of other applications wherein it is desirable to fasten or join together two surfaces or fabrics or the like. The exemplary applications of the invention particularly described herein do not and are not intended to limit the general applicability of the principles of the invention.

In general, the fastener 23 requires a pair of thermoplastic sheets which may, in some instances, constitute the two members or surfaces to be joined together by the fastener or, in other instances, may be secured to such members. In the exemplary container illustrated in 16, for example, sides 17 and 18 are made of thermoplastic material and therefore may constitute themselves the thermoplastic sheets of the fastener 23.

A narrow extent of magnetic or magnetizable material is carried on each of the thermoplastic sheets and one aspect of the present invention resides in the provision of a method and apparatus for joining or bonding such magnetizable material to the sheets.

Referring to FIGURE 2, a flat sheet of thermoplastic material such as polyethylene is denoted at 24 and the sheet extends through the nips defined by rolls 26–29. A pair of nozzles 30 and 31 extend from an outlet 32 of the plastic extrusion machine and the rolls 26–29 are rotatable to provide relative movement between the sheet 24 and the nozzles 30 and 31 in the plane of the sheet.

The nozzles 30 and 31 extrude a pair of beads 33a and 33b of thermoplastic material on a top surface 34 of the sheet 24. The two beads 33a and 33b are situated in spaced, parallel relation, and it will be appreciated that upon continuous relative movement of the sheet 34 and the nozzles 30, 31 the beads 33a and 33b may be continuously formed along the length of the sheet.

The extrudate which forms beads 33a and 33b may comprise a thermoplastic binder mixed with finely divided particles capable of being permanently magnetized, for example, barium ferrite. Such extrudate is known in the art, and as it is laid in a melted condition along the sheet it becomes permanently bonded thereto and monolithic or integral therewith.

The sheet 24 may then be passed through a magnetizing station as indicated generally at 36 in FIGURE 4 in order to permanently magnetize the particles within the beads 33a and 33b. Magnetizing station 36 may comprise a pair of electromagnets 37a and 37b around which are wound a pair of inducing coils as at 38a and 38b connected, respectively, to a source of direct current as denoted at 39a and 39b.

Each of the electromagnets has a pair of spaced-apart pole pieces. For example, magnet 37a comprises pole pieces 40a and 40b, and the polarity of the two may be such that pole piece 40a is north and 40b is south. Magnet 37b has a pair of pole pieces 41a and 41b, but pole piece 41a is a south pole while 41b is north. It will be appreciated, therefore, that the polarity of the pole pieces of electromagnets 37a and 37b are reversed with respect to one another.

As a consequence the magnetizable particles in the top portion of bead 33a as illustrated in FIGURE 4 will be charged as a south pole along the length thereof as the bead is passed between pole pieces 40a and 40b of the electromagnet 37a, and the particles in the bottom portion of bead 33a will be charged oppositely, or as a north pole, along the length of the bead.

On the other hand, the magnetic particles in the top portion of bead 33b will be given a north polarity, while the particles in the bottom portion thereof will be oppositely charged.

In order to prevent the magnetic lines of the pole pieces of the two electromagnets from interfering with one another a magnetic shield 42 extends therebetween shielding the lines of force emanating from one magnet, from the other magnet.

It will be appreciated that after the thermoplastic sheet 24 has been passed through the magnetizing station 36, the sheet can be slit along the length thereof between beads 33a and 33b to provide the two magnetic portions of the fastener 23.

In another form of the invention as illustrated in FIGURE 3, a length of magnetizable wire 43 is laid along a portion of a thermoplastic sheet 24 and a bead 44 of thermoplastic material (free of magnetic particles) is extruded from a die 46 along the sheet 24 to completely cover the wire 43 and to bond the wire to the sheet.

The wire 43 can be continuously unwound from a reel 47 and trained around a roll 48 onto a travelling sheet to render the operation continuous and the wire 43 can be permanently magnetized by passing it through the magnetizing station 36 either before or after it has been bonded to the sheet 24.

In another form of the invention the thermoplastic sheet of the fastener can be extruded, with the beads containing the magnetizable particles or wire formed thereon during the extrusion operation.

Figure 6:
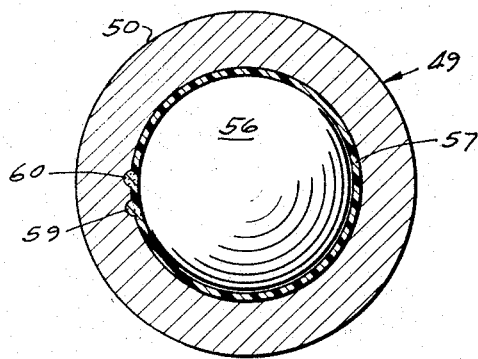
FIGURE 6 is a sectional view taken along lines VI—VI of FIGURE 5.

For example, referring to FIGURES 5 and 6 an extrusion die indicated generally at 49 comprises a housing 50 having formed therein a cylindrical bore 51 formed by a bore wall 52 extending longitudinally through the housing 50. An upstream end 53 of the housing is connected to a supply of melted thermoplastic indicated at 54 which is forced through the bore 51 in the direction of the arrow to an outlet at the opposite or downstream end of the housing 50. Although in the embodiment illustrated the thermoplastic flows downwardly, it will be appreciated by those skilled in the art that in many extrusion operations the flow of the thermoplastic is upwardly, and the principles of the present invention are equally applicable to that as well as other flow arrangements.

A torpedo or cylindrical mandrel 56 is situated concentrically within the bore 51 and has a reduced diameter with respect thereto to form an annular space 57 between the mandrel and the bore wall 52. The melted thermoplastic is forced around the mandrel and through the annular space 57 to form a tubular film at the outlet of the die.

The mandrel 56 comprises a substantially conical end portion 58 which tapers toward the upstream end of the housing 50, and formed in the bore wall 52 are a pair of grooves 59 and 60 which extend along the length of the bore wall from a point adjacent the enlarged end of the conical end portion 58 of the mandrel and which open into the annular space 57. A passage 61 is formed in the housing 50 and extends therethrough to communicate an upstream end 62 of the grooves with a source of pressurized melted thermoplastic containing magnetizable particles as indicated at 63.

Thus, as a tubular film of thermoplastic is extruded in the die 49, one or more longitudinally extending beads of thermoplastic having magnetizable particles therein may be extruded and formed on the sheet during the same extrusion operation.

In similar manner a magnetizable wire 43 may be bonded to the tubular film of thermoplastic during the extrusion process, as shown in FIGURE 7. In this form of the invention the wire 43 is directed by means of a pair of rollers 64 and 66 through a passageway 67 formed in the die housing 50 and into a longitudinal groove 59a formed in the bore wall 52. Thus, as the tubular film of thermoplastic is extruded the magnetizable wire can be embedded in a thermoplastic bead formed on the film during the same extrusion operation.

The forms of the invention illustrated in FIGURES 5–7 find particular utility in the manufacture of plastic containers such as pouches, since a pair of beads can be formed on the film as shown in FIGURES 5 and 6, and thereafter the tubular film can be slit between the beads and formed into a pouch as shown at reference numeral 16 in FIGURES 1 and 12.

Figure 9:
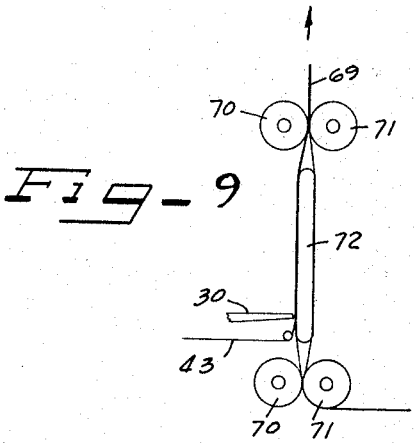
FIGURE 9 is a schematic view of another form of the apparatus shown in FIGURE 8.
Figure 8:
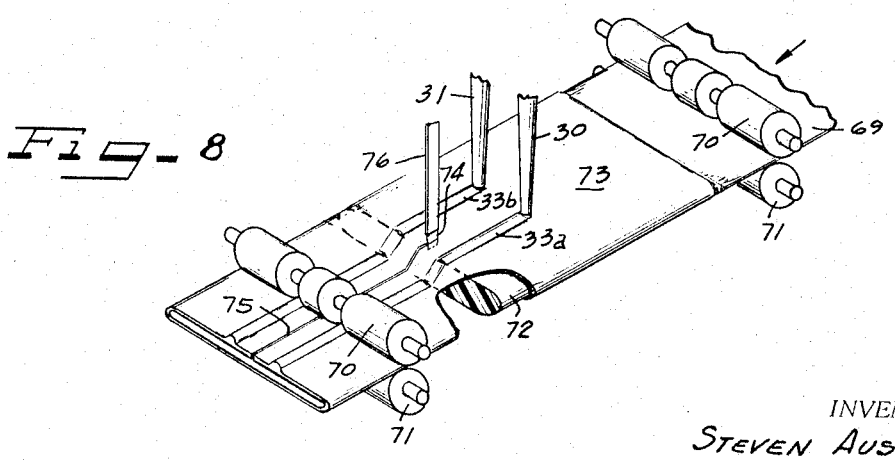
FIGURE 8 is a perspective view of apparatus constructed so as to continuously extrude one or more beads on a running tubular thermoplastic film and to simultaneously longitudinally slit the film.

Other forms of the invention which also find utility in the formation of such plastic pouches are shown in FIGURES 8 and 9. In FIGURE 8 a tubular film of thermoplastic shown at 69, which has been previously formed in an extrusion die, travels between the nips of spaced pairs of rollers 70 and 71 and around a mandrel 72 situated between the pairs of rollers. The mandrel 72 is dimensioned with respect to the tube 69 such that a top portion 73 of the tube is pulled snugly laterally acros the adjacent top portion of the mandrel 72.

A pair of extruder nozzles 30 and 31 are situated so as to extrude a pair of thermoplastic beads 33a and 33b on the top portion 73 of the film 69 as it passes across the mandrel 72.

The thermoplastic material which forms the beads 33a and 33b may contain magnetizable particles, although it will be apparent that magnetizable wire, as indicated at 43 in FIGURE 3, may be laid out on the film 69 and bonded to the film by means of the beads.

A cutter blade or similar slitting or device 74 is connected to an arm 76, or may extend upwardly from the mandrel 72, to slit the film 69 as at 75 between the beads 33a and 33b, whereupon the beaded film can be passed through a magnetizing station 36 and cut into predetermined lengths and reversely folded to form a pouch as shown in FIGURES 1 and 12.

The spaced pairs of rolls 70 and 71, while serving to move the film longitudinally, also serve to maintain the mandrel 72 in a given position within the tubular film 69 with respect to the extruder nozzles 30 and 31.

In another form of the invention shown in FIGURE 9 the film 69 runs upwardly past the rolls 70 and 71 and across the mandrel 72, rather than horizontally as shown in the embodiment of FIGURE 8. FIGURE 9 also illustrates the magnetizable wire 43 being laid on the film 69 ahead of an extruder nozzle 30 for bonding the wire to film.

In another form of the invention shown in FIGURE 10 a magnetizable wire 43 is extended along the length of a thermoplastic sheet 24 and is maintained on the sheet by means of a length of thermoplastic tape 77 which is substantially wider than the wire 43 and is directed over the wire by means of a roller 78. The tape 77 is thereupon heat-sealed to the sheet 24 by suitable means such as a pair of spaced heated wheels 79a and 79b rotatably mounted on an axle 80 and urged into snug pressing engagement with the tape and the sheet against a backing support plate 81.

The sheet 24 can be thereupon passed through a magnetizing station 36 if the wires 43 have not as yet been magnetized. If a pair of wires have been sealed to the sheet as shown in FIGURE 11, the sheet can be thereupon slit between the tapes 77.

In order to increase the magnetic effect of the wires 43 without increasing the diameters thereof the wires can be formed with rectangular cross-section in the form of a rod as shown in FIGURE 14. A pair of magnetizable rods 81 and 82 are sealed on sheets 24 by means of a pair of thermoplastic tapes 77, 77 and it will be appreciated that such rectangular configuration of the wire can also be advantageously employed in that form of the invention shown in FIGURE 3.

FIGURE 13 is illustrative of a different form of thermoplastic beads whereby the magnetic effect of the beads is increased. As shown, a pair of thermoplastic beads 86 and 87 containing magnetizable particles are extruded, respectively, on a pair of thermoplastic sheets 83 and 84. Bead 86 is formed with a longitudinal groove 88 therein to receive in abutting engagement a complementarily formed portion 89 of the bead 87. The magnetic attraction of the two beads, and therefore the fastening or closing and sealing effect of the beads is increased through the utilization of the configuration of the beads as shown in FIGURE 13, as well as in similar cross-sectional configurations wherein the areas of the abutting surfaces of the oppositely magnetized beads is increased.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

I claim as my invention:

1. A bag or the like container comprising,
   a pair of flat superimposed sheets made of thermoplastic material and sealed together at the bottom and side peripheries thereof to provide an opening into the bag at the top thereof,
   a pair of mutually confronting elongated beads of thermoplastic material formed, respectively, along the tops of the adjacent surfaces of the sheets and integrally therewith, and
   a pair of permanently magnetized wires embedded, respectively, within said beads along the lengths thereof with the polarity of each wire being reversed with respect to the other.

2. A magnetic sliderless fastener comprising,
   a pair of flexible sheets of thermoplastic material,
   a pair of mutually confronting elongated beads of thermoplastic material formed, respectively, along adjacent surfaces of the sheet and integrally therewith, and
   a pair of wires embedded, respectively, within said beads along the lengths thereof,
      at least one of said wires being permanently magnetized whereby an elongated closed magnetic circuit in cross-section is formed when the beads are in abutting engagement with one another.

3. A bag having a magnetic sliderless fastener comprising,
   a pair of flexible sheets of thermoplastic material,
   a pair of mutually confronting elongated beads of thermoplastic material formed, respectively, along adjacent surfaces of the sheets and integrally therewith, and
   a pair of wires embedded, respectively, within said beads along the lengths thereof, at least one of said wires being permanently magnetized whereby an elongated closed magnetic circuit in cross-section is formed when the beads are in abutting engagement with one another.

4. A structure for forming a container or similar article comprising
 a thin smooth continuous plastic sheet having sufficient area for being formed into a container,
 an elongate continuous flexible uniform plastic fastener bead extending in a straight thin line along said sheet and being of one piece construction therewith,
  said bead being spaced from one edge of the sheet to form a flange portion and from the other edge of the sheet to form a container body portion,
  said flange portion and said body portion being free of plastic fastener beads,
 and a magnetized material embedded within said bead to be magnetically engaged with another bead in line engagement so that one wall of a container can be releasibly attached to another wall.

5. A structure for forming a bag or similar article comprising
 a thin smooth continuous plastic sheet having sufficient area for being formed into a container and being formed as a tube,
 first and second elongate flexible uniform fastener beads extending in straight thin lines along said sheet and being of one piece construction therewith,
 said beads being spaced from each other in one circumferential direction with a smooth portion therebetween,
 said beads being spaced from each other in the other direction a greater distance than said one direction with a smooth portion therebetween,
 said smooth portions being free of fastener beads,
 and magnetized material embedded within said beads.

References Cited

UNITED STATES PATENTS

| | | | |
|---|---|---|---|
| 1,428,381 | 9/1922 | Lowen. | |
| 2,146,559 | 2/1939 | Berkowitz | 264—173 |
| 2,227,682 | 1/1941 | Wade | 264—173 |
| 2,456,141 | 12/1948 | Myerson. | |
| 2,514,750 | 7/1950 | Dobbs et al. | 150—3 |
| 2,640,798 | 6/1953 | Langer | 156—176 |
| 2,767,113 | 10/1956 | Bower | 156—176 |
| 2,959,832 | 11/1960 | Baermann | 24—201 |
| 3,102,314 | 9/1963 | Alderfer | 24—201 |
| 3,198,228 | 8/1965 | Naito | 150—3 |

FOREIGN PATENTS

| | | |
|---|---|---|
| 382,471 | 10/1932 | Great Britain. |
| 1,191,546 | 4/1959 | France. |

JOSEPH R. LECLAIR, *Primary Examiner.*

FRANKLIN T. GARRETT, *Examiner.*